Dec. 21, 1948.  R. W. HICKMAN  2,457,042
ELECTRODE FOR ARC LIGHTS
Filed Oct. 24, 1945
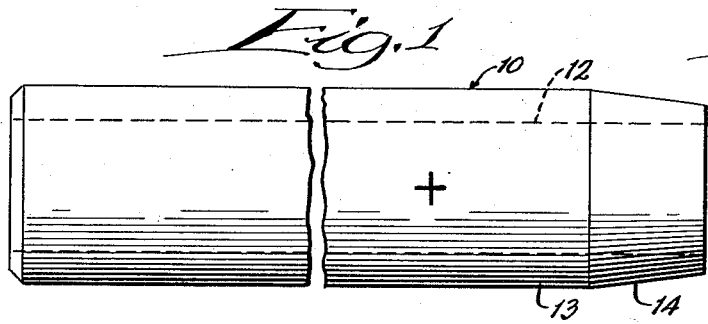
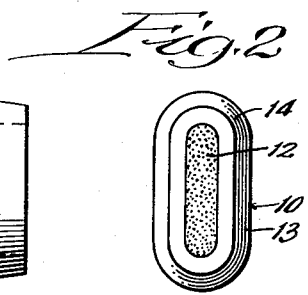
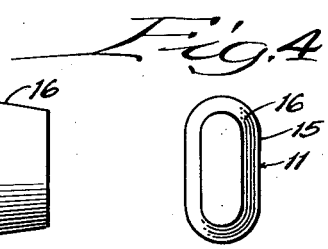
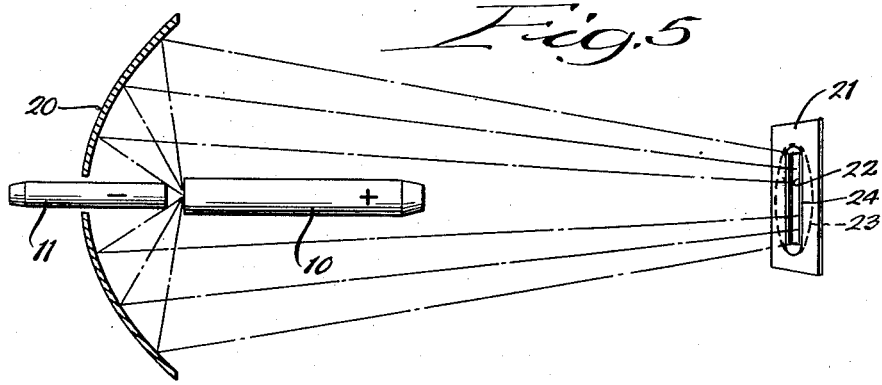
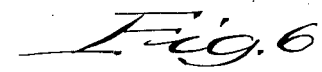
Inventor:
Robert W. Hickman,
By Dawson, Cortham & Spangenberg,
Attorneys.

Patented Dec. 21, 1948

2,457,042

UNITED STATES PATENT OFFICE 2,457,042

ELECTRODE FOR ARC LIGHTS

Robert W. Hickman, Chicago, Ill., assignor to Frederick B. Hinrichs, Chicago, Ill.

Application October 24, 1945, Serial No. 624,135

4 Claims. (Cl. 176—121)

This invention relates to electrodes such as for use in carbon arc lights.

The principal object of this invention is to provide improved electrodes for use in arc lights which will produce a crater, other than round in cross section, in the burning face of the positive electrode.

While such an arrangement has many uses, it is particularly useful, as for example in projection machines having a reflector for reflecting the light of the burning crater on an aperture plate. In projection machines of this type the temperature at the arc usually runs 2700 degrees F. to 3500 degrees F. and the temperature at the aperture plate usually runs between 1600 degrees F. to 1800 degrees F. In such projection machines utilizing a conventional arc light having a burning crater of round cross section, the light spot falling on the aperture plate is circular in shape so that in order to completely fill the usual rectangular aperture with light, considerable light falls upon the aperture plate. This produces a waste of light and causes undue heating of the aperture plate.

Following the teachings of this invention these difficulties are obviated or considerably reduced by making the cross section of the burning crater of the arc of proportions similar to the proportions of the aperture in the aperture plate so that the outline of the light spot falling on the aperture plate corresponds to the shape of the aperture therein. In this way less light falls upon the aperture plate with a resultant saving of light and considerably less heating of the aperture plate.

Other objects and advantages of this invention will become apparent to those skilled in the art upon reference to the accompanying specification, claims and drawing, in which:

Fig. 1 is an elevational view of the positive electrode;

Fig. 2 is an elevational view looking from the right of Fig. 1;

Fig. 3 is an elevational view of the negative electrode;

Fig. 4 is an elevational view looking from the right in Fig. 3;

Fig. 5 is a diagrammatic illustration of the electrodes of this invention applied to a projection machine; and Fig. 6 is a view of the aperture plate of the projection machine.

The positive electrode is generally designated at 10 in Figs. 1 and 2 and the negative electrode is generally designated at 11 in Figs. 3 and 4.

The positive electrode includes a relatively soft carbon core 12 encased in a relatively hard carbon shell 13 and the end of the positive electrode may be tapered as at 14. The positive electrode, after forming, may be baked and heat treated in the usual fashion.

The negative electrode 11 is solid and consists of a relatively hard carbon element 15 which may be tapered as at 16.

As shown in Figs. 1 to 4 the cross section of the electrodes is other than round and more specifically it is shown herein, for purposes of illustration, as being substantially oval or rectangular in cross section. Of course, the cross sections of the electrodes may be varied to meet any desired applications thereof. The size of the electrodes is dependent upon the amount of current to be used by the arc.

The cross sectional dimensions of the electrodes may be varied to suit the various applications to which they are to be put, but the cross sectional areas should be such as to carry the current used by the arc. If it is desired to have the burning crater of the arc say twice as long as it is wide, then the dimensions of the electrodes are made correspondingly. The size of the core in the positive carbon electrode is dependent upon the size of the electrode and on the current to be used. In any case, however, the core should not be larger in cross section than required to hold the arc steady and aid in the formation of the desired shaped crater.

To illustrate one use of the electrodes of this invention reference is now made to Figs. 5 and 6. In Fig. 5 the electrodes 10 and 11 are shown diagrammatically to be applied to a projection machine having the usual reflector 20 for concentrating the light from the burning crater of the arc upon an aperture plate 21 having an aperture 22. The projection machine contemplated is of the usual type and if desired magnetic means may be utilized for displacing the arc flame from between the electrodes.

In Fig. 6 the aperture plate 21 is diagrammatically disclosed as to have a rectangular shaped aperture 22. If conventional electrodes of round cross section are utilized as the source of light, the light spot falls on the aperture plate 21, as shown by the dotted circle 23. As will be seen, almost as much light falls on the aperture plate 21 as passes through the aperture 22. This causes light falling on the aperture plate 21 to be wasted and also causes undue heating of the aperture plate. This produces an extremely dangerous situation, especially if projecting film passes adjacent the aperture plate.

If, however, the carbon electrodes are formed in accordance with the teachings of this invention to produce a substantially rectangular shaped burning crater at the arc, then the light spot reflected by the reflector 20 onto the aperture plate 21 is also substantially rectangular shaped as shown at 24. Here, then, most of the light concentrated by the reflector 20 passes through the rectangular shaped aperture 22 with only a relatively small amount of the light impinging upon the aperture plate 21. Accordingly less light is wasted and heating of the aperture plate 21 is considerably reduced.

This type of carbon electrode arrangement may be used to produce a burning crater with the long dimension running vertical, horizontal, or in any other desired plane. To produce an undistorted crater in any plane other than vertical or horizontal, a magnet may be used to create a controlling field to hold the arc flame in line with the desired shape of the crater. Electrodes so used in this type of arc must not revolve in any case but both must remain stationary on their axes. The revolving of the positive electrode as in some high intensity arcs would result in the formation of a round crater and be unsuitable for the intended use here.

While for purposes of illustration one form of this invention has been disclosed, other forms thereof may become apparent to those skilled in the art and therefore this invention is to be limited only by the scope of the appended claims and prior art.

I claim as my invention:

1. In an electric arc lamp, the combination of a pair of electrodes having a substantially oval cross section and having a cross sectional area just sufficient to carry the arc current for producing a substantially oval and steady arc crater.

2. In an electric arc lamp, the combination of a negative electrode of substantially oval cross section, and a positive electrode having a relatively soft core and of substantially oval cross section and aligned with the negative electrode, the cross sectional areas of said electrodes being just sufficient to carry the arc current for producing a substantially oval and steady crater in the burning face of the positive electrode.

3. In combination with a projection machine having a reflector and an aperture plate having a substantially rectangular aperture, a pair of aligned electrodes having a substantially oval cross section and having a cross sectional area just sufficient to carry the arc current for producing a substantially oval and steady arc crater which is reflected by the reflector on the substantially rectangular aperture in the aperture plate.

4. In combination with a projection machine having a reflector and an aperture plate having a substantially rectangular aperture, a negative electrode between the reflector and the aperture plate longitudinally aligned with the aperture in the aperture plate and having a substantially oval cross section, and a positive electrode between the negative electrode and the aperture plate longitudinally aligned with the negative electrode and having a substantially oval cross section, the cross sectional areas of said electrodes being just sufficient to carry the arc current for producing a substantially oval and steady arc crater which is reflected by the reflector on the substantially rectangular aperture in the aperture plate.

ROBERT W. HICKMAN.

REFERENCES CITED

The following references are of record in the file of this patent:

UNITED STATES PATENTS

| Number | Name | Date |
| --- | --- | --- |
| 476,700 | Thurston | June 7, 1892 |
| 540,333 | Pfluger | June 4, 1895 |
| 540,800 | Parmly | June 11, 1895 |
| 679,877 | Bremer | Aug. 6, 1901 |
| 1,187,166 | Mott | June 13, 1916 |
| 1,417,089 | Mechau | May 23, 1922 |
| 1,853,778 | Rayton | Apr. 12, 1932 |
| 2,013,845 | Wolfe | Sept. 10, 1935 |
| 2,057,644 | Hall | Oct. 13, 1936 |
| 2,187,071 | Bergmans | Jan. 16, 1940 |
| 2,252,508 | Hoff | Aug. 12, 1941 |